(12) United States Patent
Schneider

(10) Patent No.: US 8,401,192 B2
(45) Date of Patent: Mar. 19, 2013

(54) MECHANISM FOR SECURELY ORDERED MESSAGE EXCHANGE

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1054 days.

(21) Appl. No.: 12/074,006

(22) Filed: Feb. 29, 2008

(65) Prior Publication Data

US 2009/0222661 A1 Sep. 3, 2009

(51) Int. Cl.
*H04L 29/06* (2006.01)
(52) U.S. Cl. ........................................ 380/262; 713/181
(58) Field of Classification Search .................. 713/181; 380/262
See application file for complete search history.

(56) References Cited

U.S. PATENT DOCUMENTS

| | | | |
|---|---|---|---|
| 5,500,897 A * | 3/1996 | Hartman, Jr. | 713/178 |
| 6,021,203 A | 2/2000 | Douceur et al. | |
| 6,343,281 B1 | 1/2002 | Kato | |
| 6,449,473 B1 * | 9/2002 | Raivisto | 455/410 |
| 6,907,473 B2 | 6/2005 | Schmidt et al. | |
| 6,948,661 B2 | 9/2005 | Silverbrook et al. | |
| 7,140,726 B2 | 11/2006 | Silverbrook | |
| 7,234,059 B1 | 6/2007 | Beaver et al. | |
| 7,330,838 B2 | 2/2008 | Rogers et al. | |
| 7,770,032 B2 | 8/2010 | Nesta et al. | |
| 7,848,517 B2 | 12/2010 | Britz et al. | |
| 7,992,006 B2 | 8/2011 | She | |
| 2002/0087729 A1 | 7/2002 | Edgar | |
| 2003/0005284 A1 | 1/2003 | Euchner | |
| 2003/0126091 A1 | 7/2003 | Rogers et al. | |
| 2004/0003116 A1 | 1/2004 | Munger et al. | |
| 2004/0015999 A1 | 1/2004 | Carlucci et al. | |
| 2004/0098485 A1 | 5/2004 | Larson et al. | |
| 2004/0107285 A1 | 6/2004 | Larson et al. | |
| 2004/0107286 A1 | 6/2004 | Larson et al. | |
| 2005/0097569 A1 * | 5/2005 | Chandrasekaran | 719/318 |
| 2005/0166046 A1 | 7/2005 | Bellovin et al. | |
| 2005/0246546 A1 | 11/2005 | Takagi et al. | |
| 2006/0123134 A1 | 6/2006 | Munger et al. | |
| 2006/0209766 A1 | 9/2006 | Britz et al. | |
| 2006/0274856 A1 | 12/2006 | Dunn et al. | |
| 2007/0035566 A1 | 2/2007 | Silverbrook | |
| 2007/0237145 A1 * | 10/2007 | Adhikari et al. | 370/392 |
| 2007/0260879 A1 | 11/2007 | Dzung | |
| 2007/0288768 A1 | 12/2007 | Nesta et al. | |
| 2008/0016549 A1 | 1/2008 | Smithson | |

(Continued)

OTHER PUBLICATIONS

RSA Laboratories. "What is Diffie Hellman?" www.rsa.com/rsalabs/node.asp?id=2248 May 6, 2007 from Internet Archive Wayback Machine pp. 1-2.*

(Continued)

*Primary Examiner* — Jason K. Gee
*Assistant Examiner* — Lisa Lewis
(74) *Attorney, Agent, or Firm* — Lowenstein Sandler LLP

(57) ABSTRACT

In one embodiment, a mechanism for securely ordered message exchange is disclosed. In one embodiment, a method includes associating sequence numbers with each of a plurality of messages that are part of a transmission from a broadcaster to an intended recipient, and for each message of the plurality of messages, calculating a unique message authentication code (MAC) using as inputs the message, a shared secret key, and the associated sequence number. The method also includes sending to the intended recipient the plurality of messages each with the associated calculated MAC attached to the message.

25 Claims, 5 Drawing Sheets

U.S. PATENT DOCUMENTS

| | | |
|---|---|---|
| 2008/0022174 A1 | 1/2008 | Bancel et al. |
| 2008/0040791 A1 | 2/2008 | Munger et al. |
| 2008/0040792 A1 | 2/2008 | Larson et al. |
| 2008/0123124 A1 | 5/2008 | Smithson |
| 2008/0209214 A1 | 8/2008 | Schrijen et al. |
| 2008/0216168 A1 | 9/2008 | Larson et al. |
| 2009/0044025 A1 | 2/2009 | She |
| 2009/0063850 A1 | 3/2009 | Joram et al. |

OTHER PUBLICATIONS

U.S. Appl. No. 12/074,092, Office Action dated Jan. 24, 2011, 13 pages.

U.S. Appl. No. 12/074,092, Final Office Action dated Apr. 11, 2011, 12 pages.

Red Hat, Inc. Office Action for U.S. Appl. No. 12/074,092, mailed Sep. 30, 2011.

USPTO. Office Action for U.S. Appl. No. 12/074,034 mailed Nov. 21, 2011.

USPTO, Final Office Action for U.S. Appl. No. 12/074,034 mailed Apr. 23, 2012.

USPTO, Advisory Action for U.S. Appl. No. 12/074,034 mailed Jul. 10, 2012.

USPTO, Notice of Allowance for U.S. Appl. No. 12/074,092 mailed Jan. 25, 2012.

* cited by examiner

MECHANISM FOR SECURELY ORDERED MESSAGE EXCHANGE

TECHNICAL FIELD

The embodiments of the invention relate generally to data communications and, more specifically, relate to securely ordered message exchange in data communications.

BACKGROUND

Data communications suffer from the weakness of intentional invasion by snoopers and other third-party interlopers. Even in cases where data communications are encrypted using some secure mechanism, such as Secure Sockets Layer (SSL), it is still possible for traffic analysis to be conducted where both endpoints of the communication and how much traffic is passed between them may be determined. This is information that the endpoints may not have wanted to be public. In addition, some data communications may operate in environments where certain types of cryptography and ciphering are not a legal alternative for implementation.

Some conventional techniques for protection of broadcast data communication schemes generally present a few problems with data security. One problem is that the end points of the data communication cannot reliably authenticate who they are speaking with. Another problem is that information within the data communication may be disclosed to parties whom the endpoints do not want to see the information.

In addition, conventional techniques for protection of broadcast data communications do not provide for the secure ordering of sequences of messages sent in a randomized order. Such secure ordering would prevent a third-party eavesdropper from knowing who was supposed to receive which messages and in what order the messages were supposed to be sent. This is especially the case in those broadcast channels where export controls and legal restrictions on cryptographic software exist. Similarly, conventional techniques for protection of broadcast data communications typically present the problem that a broadcaster cannot guarantee that an intended recipient actually receives and processes the messages in a particular sequence in which the broadcaster intended the recipient to receive.

In light of the above problems, a way to ensure that broadcast of data communications falling under a sequenced order are not vulnerable to the traffic analysis snooping described above would be beneficial. In addition, such a solution would be beneficial if it allowed for the reliable authentication of end points of the sequenced data communication, security of the information within the sequenced data communication, and acknowledgment from the recipient of acceptance of the sequenced data communication.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
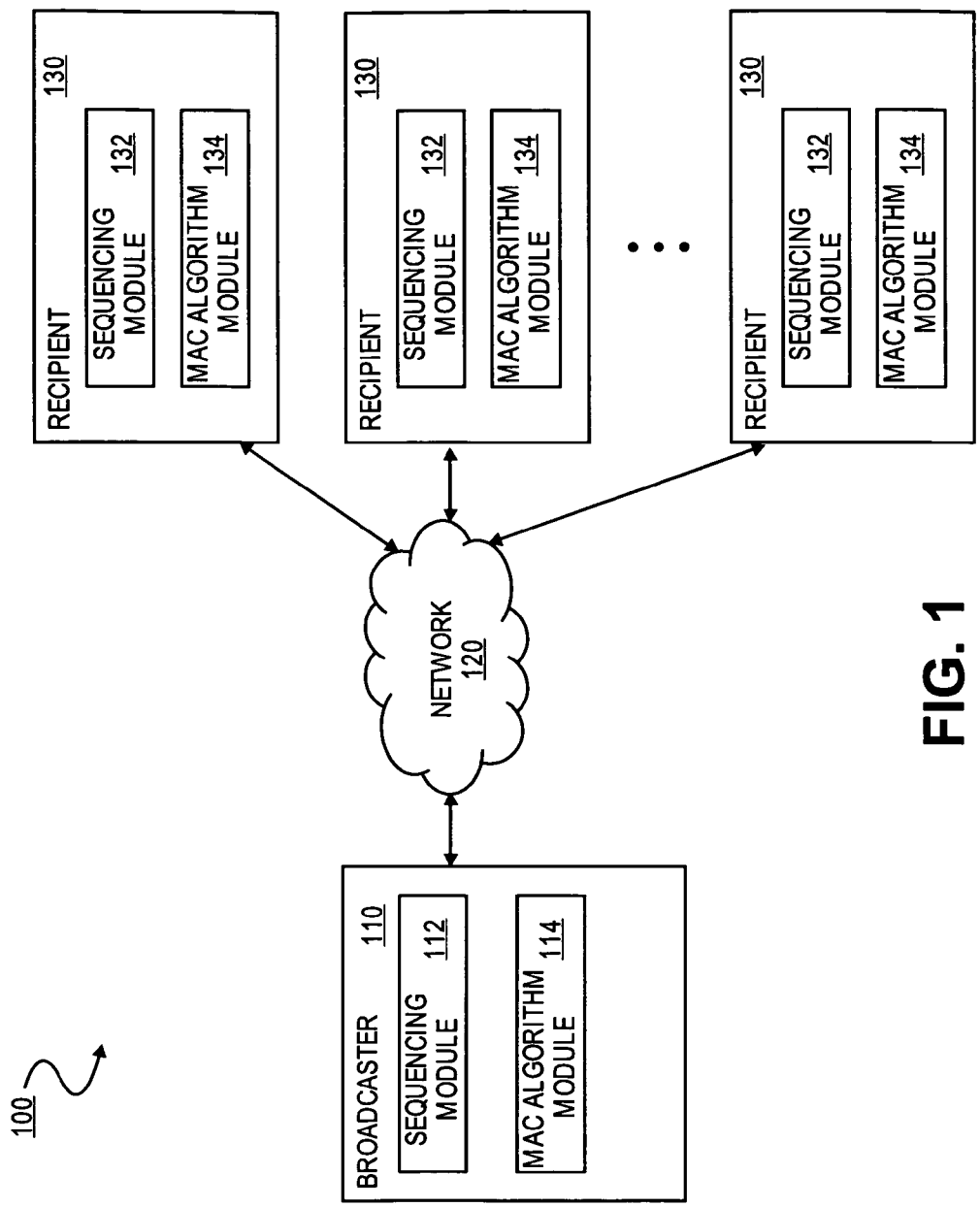
FIG. 1 is a block diagram of an exemplary network architecture in which embodiments of the invention may be implemented.

Embodiments of the invention provide for securely ordered message exchange. In one embodiment, a method for providing securely ordered message exchange includes associating sequence numbers with each of a plurality of messages that are part of a transmission from a broadcaster to an intended recipient, and for each message of the plurality of messages, calculating a unique message authentication code (MAC) using as inputs the message, a shared secret key, and the associated sequence number. The method also includes sending to the intended recipient the plurality of messages each with the associated calculated MAC attached to the message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory. ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram of an exemplary network architecture in which embodiments of the invention may be implemented. The network architecture system 100 includes a broadcaster 110 and a plurality of recipients 130 coupled by a network 120. Network 120 may be a public network (e.g., Internet) or a private network (e.g., Ethernet or a Local Area Network (LAN)). In one embodiment, each of the broadcaster 110 and recipients 130 is a computing system that engages in data communications. In some embodiments, broadcaster 110 sends out multicast or simulcast communications to each of the recipients 130 at the same time. In other embodiments, broadcaster 110 may communicate with recipients 130 in a unicast fashion. In yet other embodiments, broadcaster 110 and recipients 130 may be participating in a peer-to-peer data communication arrangement.

In addition, broadcaster 110 may include a sequencing module 112 and a message authentication code (MAC) algorithm module 114. Similarly, each of recipients 130 may include a sequencing module 112 and a MAC algorithm module 114. In one embodiment, sequencing modules 112, 132 and MAC algorithm modules 114, 134 may be used in conjunction with each other to enable broadcaster 110 and recipients 130 to securely order a message exchange in their data communications in a reliable, yet anonymous, fashion.

In particular, the broadcaster 110 may include a specialized message authentication code (MAC) with each message of a sequence of messages being sent to one or more recipients. The MAC incorporates not only the message being sent and a shared secret key kept between the broadcaster and recipient, but also a sequence number. Embodiments of the invention can be used to build a strongly reliable stream-oriented connection-based transport protocol over an unreliable protocol (similar to TCP over IP) that also has the feature that the stream messages cannot be spoofed or altered.

Figure 2:
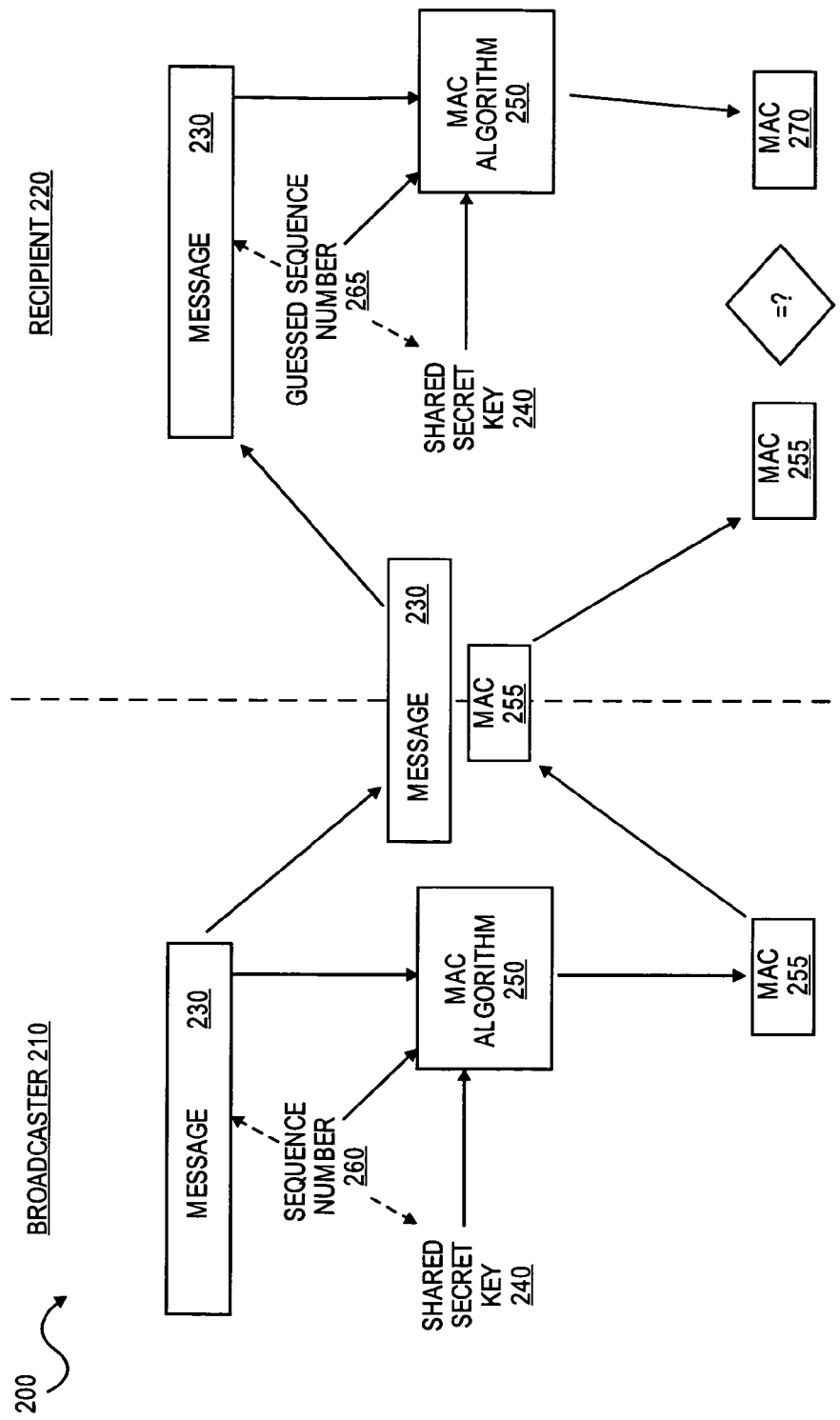
FIG. 2 is a block diagram depicting the utilization of sequence numbers between broadcaster and recipient according to embodiments of the invention.

FIG. 2 is a block diagram depicting the utilization of sequence numbers between a broadcaster and recipient according to embodiments of the invention. System 200 depicts a communication between broadcaster 210 and recipient 220. In one embodiment, broadcaster 210 may be the same as broadcaster 110 and recipient 220 may be the same as recipient 130, as described above with respect to FIG. 1. In one embodiment, broadcaster 210 is sending a message 230 to recipient 220. Message 230 is part of a sequence of messages of an overall transmission being sent to recipient 220. The overall transmission may be broken up into smaller sequence messages due to a variety of reasons, such as communication protocol size requirements, efficiency of communication, security, etc. Each message is assigned a unique sequence number that will be utilized on the receiving end 220 to re-order the messages into the overall transmission.

Broadcaster 210 creates a MAC 255 by plugging a variety of inputs into MAC algorithm 250. In one embodiment, MAC algorithm modules 114, 134 of FIG. 1 may be utilized to perform the functions of MAC algorithm 250. As illustrated, the inputs into MAC algorithm 250 include the message itself 230, a shared secret key 240, and the unique sequence number 260 assigned to the message. In some embodiments, the MAC algorithm 250 is an algorithm previously agreed upon between the broadcaster 210 and recipient 220. The shared secret key 240 is a public-private key pair such that the private key of one actor and the public key of another can be combined to create a key the two actors will share. This shared secret key is unique between the broadcaster/recipient pair and is only known by the pair.

In one embodiment, the shared secret key is created using a Diffie Hellman key exchange protocol. The Diffie Hellman key exchange protocol is a cryptographic protocol that allows two parties that have no prior knowledge of each other to jointly establish a shared secret key over an insecure communications channel. This key can then be used to encrypt subsequent communications using a symmetric key cipher. One skilled in the art should have knowledge of how to establish a shared secret key using Diffie Hellman key exchange protocol. In other embodiments, other cryptographic protocols may be utilized to establish a shared secret key.

In one embodiment, the sequence number 260 is appended to the message 230 and that result is then used as an input into the MAC algorithm 250 along with the shared secret key 240 to create the MAC 255. In another embodiment, the sequence number 260 is part of the shared secret key 240 and that result is then used as an input into the MAC algorithm 250 along with the message 230 to create the MAC 255.

The message 230 and MAC 255 are then sent to the recipient 220. The recipient 220 guesses the sequence number 265 of the message (based upon a previously-agreed upon initial sequence number and sequence order scheme). This guessed sequence number 265 is incorporated with the message 230 and shared secret key 240 as inputs into MAC algorithm 250 to create a MAC 270.

The recipient 220 compares this MAC 270 with the MAC 255 sent with the message 230 to determine if there is a match. If so, then the recipient 220 is the intended recipient of the message 230 and the guessed sequence number 265 is the correct sequence number for the message 230. If there is not a match, then the recipient 220 should iteratively step through the possible sequence numbers 265 in creating MAC 270 until either a match is found or the possible sequence numbers are exhausted.

The scheme as illustrated in FIG. 2 is repeated for each of the messages in the sequence of the overall transaction (which may be sent in a random order). In this way, at the end of all of the broadcasting, the recipient 220 will be able to put the received messages intended for the recipient 220 back into order to determine the overall transaction message.

In some embodiments, a message may be sent to multiple recipients in a simultaneous fashion. In addition, the broadcaster 210 has the option of including multiple pseudo-MACs with the message 230 and sending multiple bogus messages with pseudo-MACs to the recipient 220. As a result, the broadcaster 210 can send messages in such a way that, in addition to not being authenticated by anybody but the intended recipient 220, the messages are no longer readable by anybody but the intended recipient 220 because they are sent in a random order so that no one but the intended recipient would be able to put them back into order.

Figure 3:
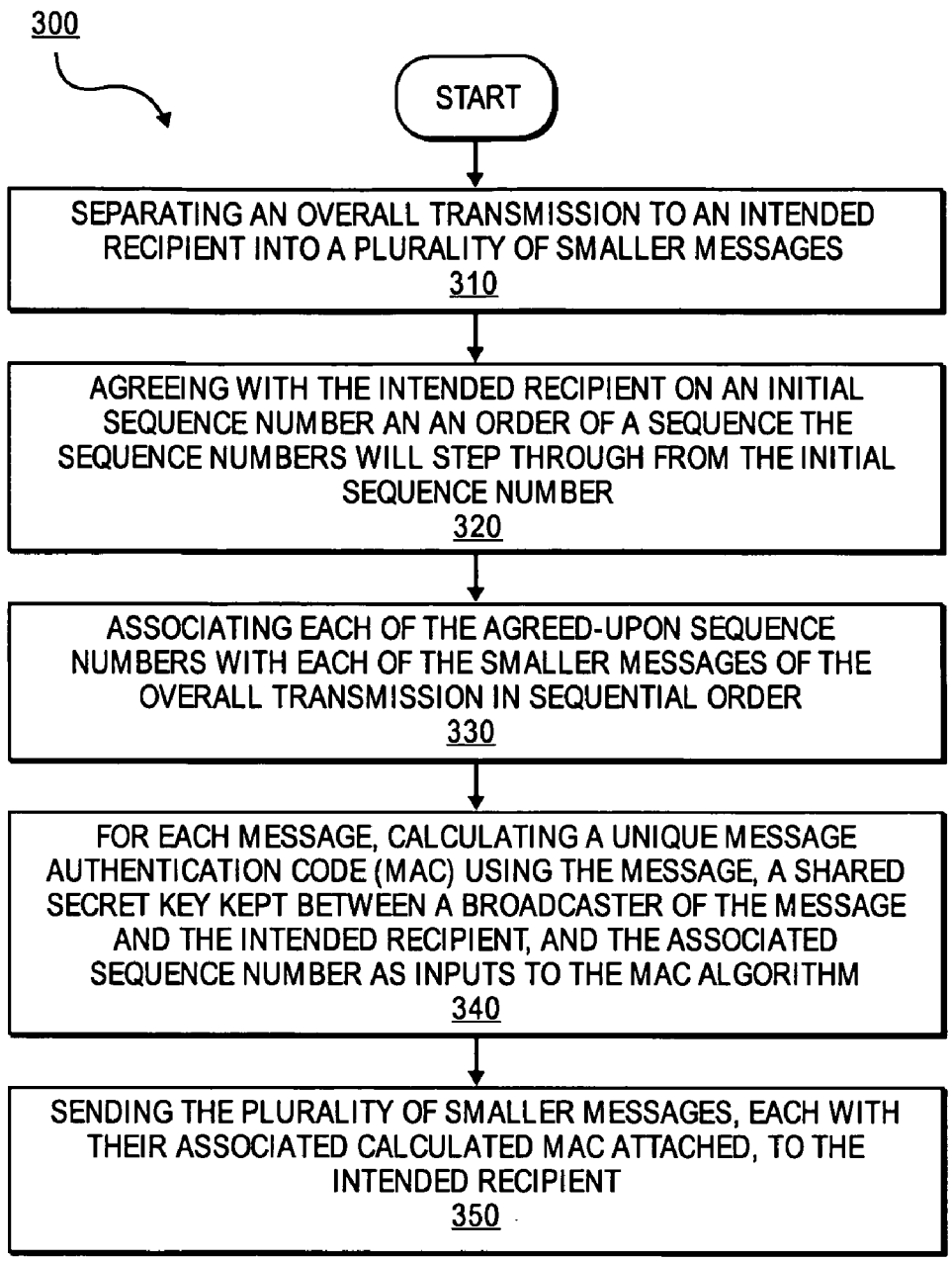
FIG. 3 is a flow diagram illustrating securely ordered message exchange by a broadcaster according to one embodiment of the invention.

FIG. 3 is a flow diagram illustrating a method 300 for securely ordered message exchange by a broadcaster according to one embodiment of the invention. Method 300 may be performed by processing logic at a broadcaster that may comprise hardware (e.g., circuitry, dedicated logic, programmable logic, microcode, etc.), software (such as instructions run on a processing device), or a combination thereof. In one embodiment, method 300 is performed by sequencing module 112 of FIG. 1. In one embodiment, the broadcaster of method 300 may be broadcaster 110 or broadcaster 210 communicating with recipient 130 and/or 220 over network 120, as described with respect to FIGS. 1 and/or 2.

Method 300 begins at block 310 where the broadcaster separates an overall transmission to be sent to the intended recipient into a plurality of smaller messages. Then, at block 320, the broadcaster agrees with the intended recipient on an initial sequence number and an order of a sequence in which the sequence numbers will progress through from the initial sequence number. In some embodiments, the first sequence could be given as part of the message, or every sequence of messages between two parties could start at a predetermined sequence number. In addition, the number does not need to be the same in each direction. For example, messages from A to B could start with sequence number 23, while those from B to A could start at 817.

Also, the sequence order does not have to be in a monotonically incrementing fashion. In one embodiment, the sequence order may be set up in some non-obviously ordered sequence. For example, a linear congruential generator may be used to generate the next sequence number so that the sequence number ordering is not in an obviously-linear fashion. One skilled in the art will appreciate that the timing of blocks 310 and 320 is arbitrary and one may occur before the other.

At block 330, the broadcaster associates each of the agreed-upon sequence numbers with each of the messages of the overall transmission in the determined sequential order. Then, at block 340, the broadcaster calculates, for each message, a unique MAC using the message, the shard secret key kept between the broadcaster and the intended recipient, and the associated sequence number as inputs to the MAC algorithm.

In one embodiment, the sequence number is appended to the end of the message and this appended message is used in combination with the shared secret key to calculate the MAC. In another embodiment, the sequence number is used a part of the shared secret key and this adapted shared secret key is used in conjunction with the message to calculate the MAC. There are a number of possibilities to adapt the shared secret key with the sequence number including, but not limited to, appending the sequence number to the shared secret key, adding the sequence number to the shared secret key, and using the sequence number as an object in a function on the shared secret key (e.g., multiply the shared secret key by the sequence number and take the remainder with the large prime number that was used to generate the key initially), and so on. Finally, at block 350, the broadcaster sends the plurality of messages, each with their associated calculated MAC attached, to the intended recipient.

Figure 4:
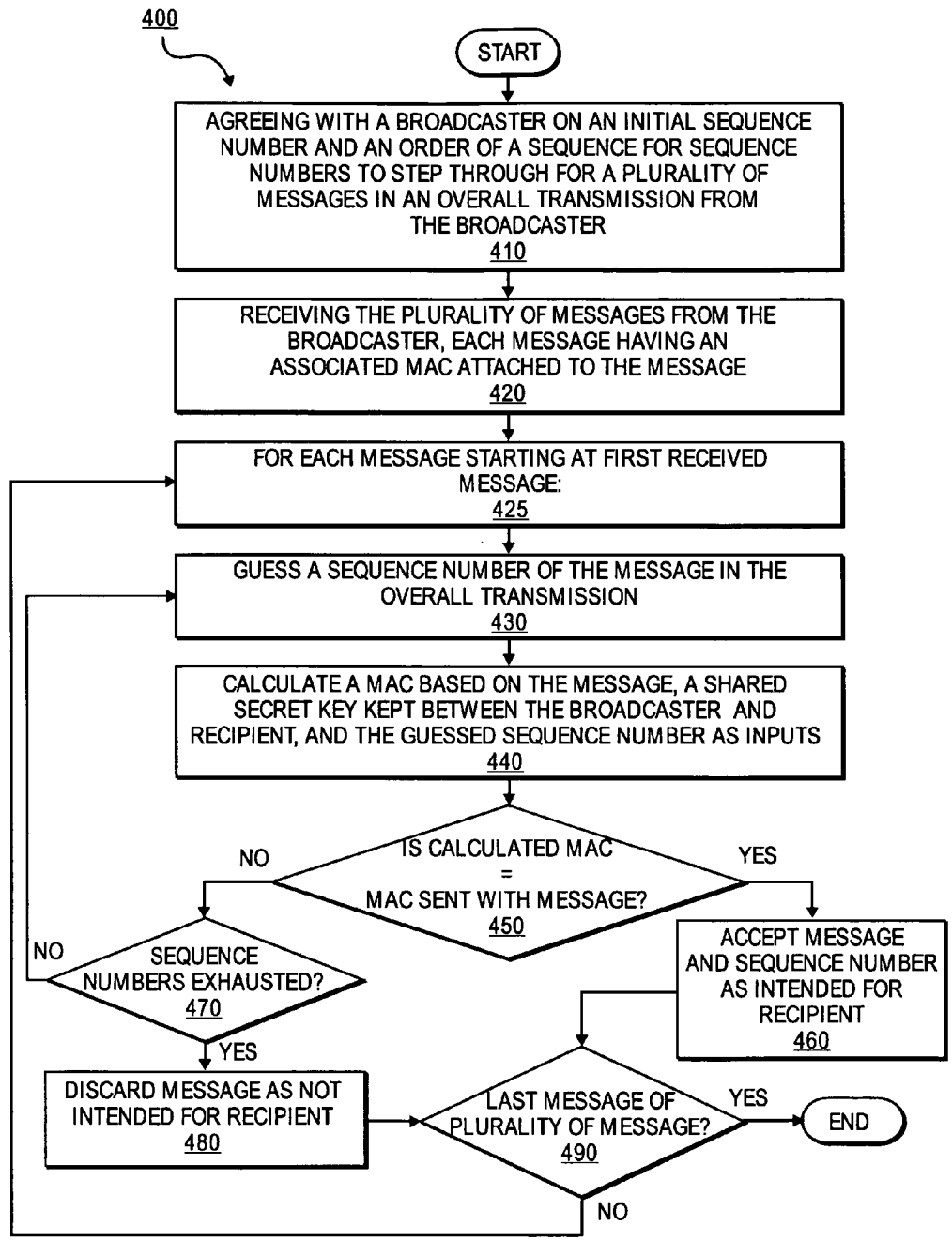
FIG. 4 is a flow diagram illustrating securely ordered message exchange by a recipient according to one embodiment of the invention.

FIG. 4 is a flow diagram illustrating a method 400 for securely ordered message exchange by a recipient according to one embodiment of the invention. Method 400 may be performed by processing logic at a broadcaster that may comprise hardware (e.g., circuitry, dedicated logic, programmable logic, microcode, etc.), software (such as instructions run on a processing device), or a combination thereof. In one embodiment, method 400 is performed by the sequence number module 132 of FIG. 1. In one embodiment, the broadcaster of method 300 may be recipient 130 or recipient 220 communicating with broadcaster 110 and/or 210 over network 120, as described with respect to FIGS. 1 and/or 2.

Method 400 begins at block 410, where the recipient agrees with the broadcaster on an initial sequence number and an order of a sequence for the sequence numbers to step through for a plurality of messages in an overall transmission from the broadcaster. Then, at block 420, the recipient receives the plurality of messages from the broadcaster, each message having an associated MAC attached to the message.

Then, for each message, starting at the first received message (block 425), a number of processes are performed. First, at block 430, the recipient guesses a sequence number of the message in the overall transmission. Then, at block 440, the recipient calculates a MAC based on the message, a shared secret key kept between the broadcaster and the recipient, and the guessed sequence number as inputs. As discussed above with respect to FIG. 3, the recipient will adapt, based on a pre-determined protocol with the broadcaster, either the message or the shared secret key by the guessed sequence number to produce the input to be used to calculate the MAC.

At decision block 450, the recipient determines whether the calculated MAC matches the MAC sent with the message. If there is a match, then at block 460 the recipient accepts the message and sequence number as intended for the recipient. If there is not a match, method 400 moves to block 470 where the recipient determines if the list of possible sequence numbers to guess has been exhausted. If not, the recipient returns to block 430 and increments the guessed sequence number to the next possible sequence number in the pre-determined sequence. Any sequence numbers that have already been determined and accepted as part of a message intended for the recipient should not be reused as possible guesses for subsequent sequence numbers. If the list of possible sequence numbers has been exhausted at decision block 470, then the recipient discards the message as not intended for the recipient at block 480.

Then, method 400 moves on to decision block 490 where it is determined whether the message being processed is the last of the plurality of messages in the overall transmission being sent. If not, method 400 returns to block 425 where the next received message is processed in a similar fashion as described above. If it is the last message, then method 400 ends and the recipient may assemble the accepted messages according to their associated sequence numbers to create the overall transmission.

Although embodiments of the invention may take some time for the recipient to iteratively guess sequence numbers for each received message (i.e., time proportional to $Cn^2$, where n is the number of messages and C is a constant), it will take an eavesdropper some time proportional to n!, which is a much longer and implausible time period.

In addition, in some embodiments, it may be possible for the recipient to send messages back to the broadcaster to acknowledge messages that they have received and accepted. In this scenario, assume the recipient holds a sequence number that was determined for the particular message to be acknowledged. The recipient would take a large random value and either (1) append the sequence number for the message they are acknowledging to the large random value or (2) use the sequence number for the message they are acknowledging as part of the shared secret key. The recipient computes the MAC using the appended random value or the adapted shared secret key. Then the recipient would send the random value and the MAC to the broadcaster. The broadcaster would be able to compare the MAC they compute from the large random value number message with their set of unacknowledged sequence numbers and know which messages the recipient has received and which messages are still unacknowledged.

The following is a description of an example implementation of the methods 300 and 400 described above with respect to FIGS. 3 and 4. One skilled in the art will appreciate that this example is in no way limiting of embodiments of the invention and is only provided to illuminate and clarify the benefits of embodiments of the invention.

Assume that a broadcaster would like to send the message "ATTACK_AT_DAWN" to one or more recipients. The broadcaster breaks down the message into fragments as follows:

| 1 | 2 | 3 | 4 | 5 | 6 | 7 |
|---|---|---|---|---|---|---|
| AT | TA | CK | _A | T_ | DA | WN |

Assume the broadcaster and recipient have previously agreed to start the sequence at the value 1 and increment the sequence monotonically in increments of 1. Also, assume they have agreed to calculate the MACs by appending the sequence, number to the end of the message. Finally, they have also determined the shared secret key, 'k', which exists between them.

Then, the broadcaster computes a MAC for each message as follows:

"AT1"+k=MAC for $1^{st}$ message ["MAC1"]
"TA2"+k=MAC for $2^{nd}$ message ["MAC2"]
"CK3"+k=MAC for $3^{rd}$ message ["MAC3"]
"_A4"+k=MAC for $4^{th}$ message ["MAC4"]
"T_5"+k=MAC for $5^{th}$ message ["MAC5"]
"DA6"+k=MAC for $6^{th}$ message ["MAC6"]
"WN7"+k=MAC for $7^{th}$ message, ["MAC7"]

The broadcaster then sends the original messages with their associated calculated MACs attached in a random order. Assume that this random order is as follows: 4, 7, 2, 1, 3, 6, 5. As a result, the following is sent to the recipient:

| "_A"+ MAC4 | "WN"+ MAC7 | "TA"+ MAC2 | "AT"+ MAC1 | "CK"+ MAC3 | "DA"+ MAC6 | "CK"+ MAC5 |
|---|---|---|---|---|---|---|

Upon receiving the messages, the recipient takes the first message received and uses the first initial sequence number as the guessed sequence number to calculate the MAC for the message. As such, the recipient would first calculate a MAC for "_A1" and 'k'. The resulting MAC would not be a match to the MAC sent with the message, MAC4, so the recipient would continue to iteratively guess sequence numbers until the list of possible sequence numbers is exhausted. For example, the recipient would then try "_A2"+'k', with no match to the MAC; then try "_A3"+'k' with no match to the MAC; and then try "_A4"+'k' and here they would find a match to the MAC sent with the message. Then, the recipient would move onto the next message, "WN" and would iteratively guess sequence numbers, but this time the recipient would not use the sequence number 4, and would only guess the sequence numbers 1-3 and 5-7.

This process continues until all of the received messages have been processed or discarded. Once all the messages have been processed, the recipient would assemble the messages in order according to their sequence numbers to create the overall transmission, "ATTACK_AT_DAWN," from the broadcaster. This process can be intertwined with bogus message and pseudo-MACs, as well as being utilized in a multicast environment, to provide a reliable, yet anonymous and secure, way to broadcast messages without being susceptible to snooping and traffic analysis by third-party eavesdroppers.

Figure 5:
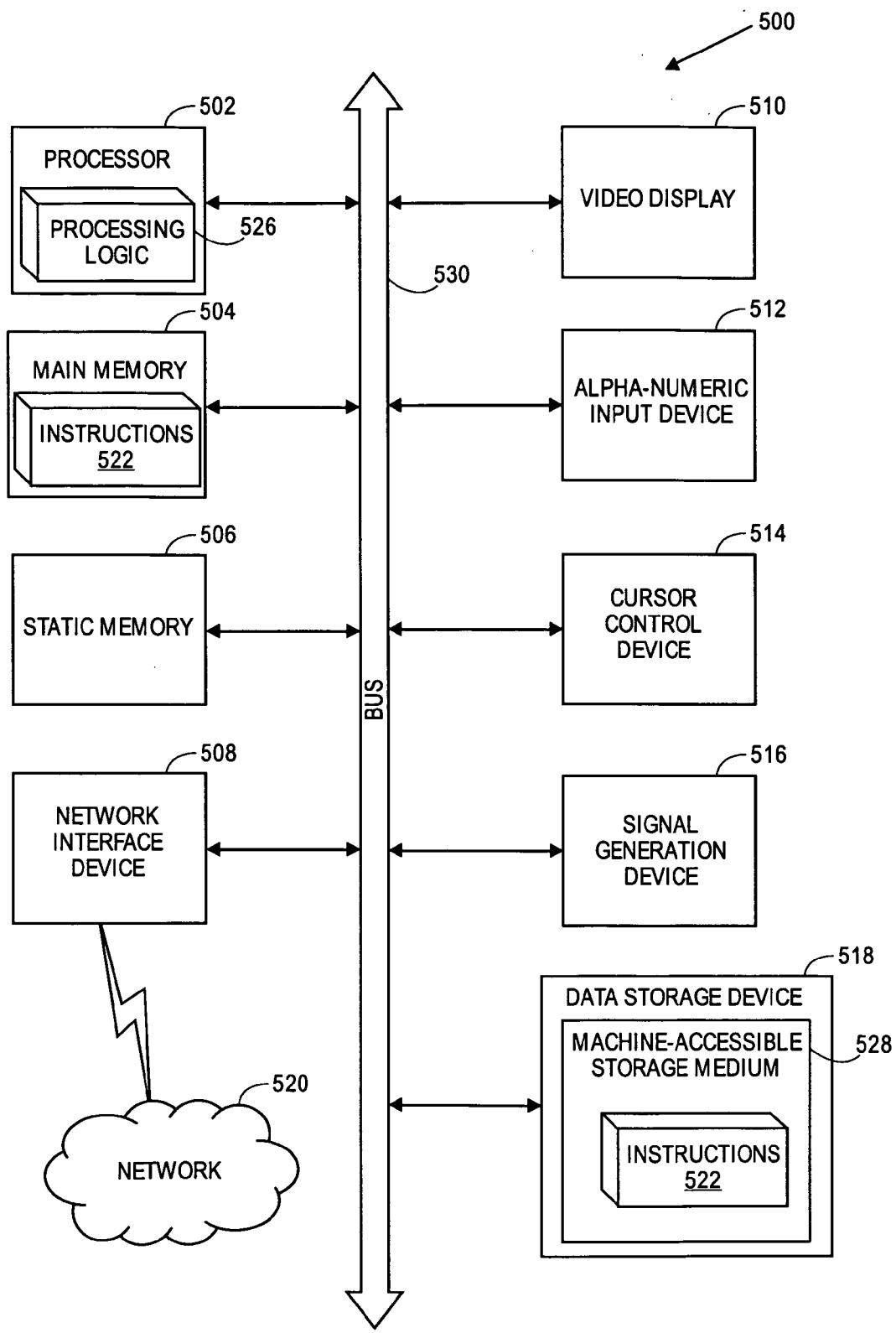
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508. In some embodiments, network interface device 508 may be utilized to receive messages from the broadcaster or recipients described in various embodiments of this invention.

The machine-readable storage medium 528 may also be used to store broadcaster sequencing logic and/or recipient sequencing logic (e.g., sequencing modules 112, 132 of FIG. 1), and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    associating, by a processing device, sequence numbers with each of a plurality of messages that are part of a transmission from a broadcaster to a recipient;
    for each message of the plurality of messages, calculating, by the processing device, a message authentication code (MAC) for the message, the calculating comprising:
        modifying each of the message and a shared secret key with the associated sequence number; and
        generating the MAC from a MAC algorithm that uses as inputs the modified message, the modified shared secret key, and the associated sequence number; and
    sending, by the processing device, the plurality of messages to the recipient, each message having the associated calculated MAC for the message attached to the message.

2. The method of claim 1, wherein the associated sequence number is appended to the end of the message in order to calculate the MAC.

3. The method of claim 1, wherein the associated sequence number is part of the shared secret key, in order to calculate the MAC.

4. The method of claim 3, wherein the sequence to number is part of the shared secret key due to at least one of attaching the sequence number to the end of the shared secret key, adding the sequence number to the shared secret key, or using the sequence number as an object of a function with the shared secret key.

5. The method of claim 1, wherein the shared secret key is a unique key kept between the recipient and the broadcaster and is based on a Diffie Hellman key exchange protocol.

6. The method of claim 1, wherein a first sequence number of the sequence numbers for the messages of the transmission is agreed upon between the broadcaster and the recipient prior to the associating of the sequence numbers to the messages.

7. The method of claim 1, wherein a sequence type of the sequence numbers is agreed upon between the broadcaster and the recipient prior to the associating of the sequence numbers to the messages.

8. A computer-implemented method, comprising:
    receiving, by a processing device of a recipient, a plurality of messages from a broadcaster as part of a transmission to the recipient, each message having an associated message authentication code (MAC) attached to the message;
    for each message:
        guessing, by the processing device, a sequence number of the message in the transmission;
        calculating, by the processing device, a MAC for the message, the calculating comprising:
            modifying each of the message and a shared secret key with the associated guessed sequence number; and
            generating the MAC from a MAC algorithm that uses as inputs the modified message, the modified shared secret key, and the associated sequence number;
        comparing the calculated MAC to the MAC attached to the message for a match;
        when there is a match, accepting the message and guessed sequence number as intended for the recipient; and
        when there is not a match, repeating the guessing, the calculating, and the comparing for each successive guessed sequence number until the sequence numbers are exhausted; and
    placing the messages that were accepted as intended for the recipient in sequential order based on their associated sequence number to create the transmission from the broadcaster.

9. The method of claim 8, wherein the sequence number is appended to the end of the message in order to calculate the MAC.

10. The method of claim 8, wherein the sequence number is part of the shared secret key, in order to calculate the MAC.

11. The method of claim 10, wherein the sequence number is part of the shared secret key due to at least one of attaching the sequence number to the end of the shared secret key, adding the sequence number to the shared secret key, or using the sequence number as an object of a function with the shared secret key.

12. The method of claim 8, wherein guessing the sequence number further comprises:
    starting at an initial sequence number previously agreed to between the broadcaster and the recipient; and
    stepping through the successive sequence numbers in an order previously agreed to between the broadcaster and the intended recipient.

13. The method of claim 8, wherein the shared secret key is a unique key kept between the recipient and the broadcaster and is based on a Diffie Hellman key exchange protocol.

14. The method of claim 8, further comprising discarding the message when all of the guessed sequence numbers are exhausted.

15. The method of claim 8, further comprising acknowledging each accepted message by:
generating a random number value;
appending the guessed sequence number associated with the accepted message to the random number value;
calculating a MAC of the appended sequence number; and
sending the random number value and the calculated MAC of the appended sequence number to the broadcaster.

16. A non-transitory machine-readable storage medium including data that, when accessed by a machine, cause the machine to perform operations comprising:
associating, by a processing device, sequence numbers with each of a plurality of messages that are part of a transmission from a broadcaster to a recipient;
for each message of the plurality of messages, calculating, by the processing device, a message authentication code (MAC) for the message, the calculating comprising:
modifying each of the message and a shared secret key with the associated sequence number; and
generating the MAC from a MAC algorithm that uses as inputs the modified message, the modified shared secret key, and the associated sequence number; and
sending, by the processing device, the plurality of messages to the recipient, each message having the associated calculated MAC for the message attached to the message.

17. The non-transitory machine-readable storage medium of claim 16, wherein the associated sequence number is appended to the end of the message in order to calculate the MAC.

18. The non-transitory machine-readable storage medium of claim 16, wherein the associated sequence number is part of the shared secret key in order to calculate the MAC.

19. The non-transitory machine-readable storage medium of claim 16, wherein the shared secret key is a unique key kept between the intended recipient and the broadcaster and is based on a Diffie Hellman key exchange protocol.

20. The non-transitory machine-readable storage medium of claim 16, wherein:
a first sequence number of the sequence numbers for the messages of the transmission is agreed upon between the broadcaster and the recipient prior to the associating of the sequence numbers to the messages; and
a sequence type of the sequence numbers is agreed upon between the broadcaster and the intended recipient prior to the associating of the sequence numbers to the messages.

21. An apparatus, comprising:
a memory;
a processing device communicably coupled to the memory;
a network device communicably coupled to the memory and the processing device, the network device in communication with a network to receive a plurality of messages from a broadcaster, each message having an associated message authentication code (MAC) attached to the message;
a MAC algorithm module executable from the memory by the processing device and communicably coupled to the network device, the MAC algorithm module configured to calculate a MAC by:
modifying each of the message and a shared secret key with an associated guessed sequence number of the message in a transmission from the broadcaster; and
generating the MAC from a MAC algorithm that uses as inputs the modified message, the modified shared secret key, and the guessed sequence number; and
a sequencing module executable from the memory by the processing device and communicably coupled to the network device, the sequencing algorithm module configured to
compare the calculated MAC to the MAC attached to the message for a match;
wherein when there is a match, the sequencing module configured to accept the message and guessed sequence number as intended for a recipient of the message; and
wherein where there is not a match, the MAC algorithm module and the sequencing module configured to repeat the calculating and the comparing for each successive guessed sequence number until the sequence numbers are exhausted.

22. The apparatus of claim 21, wherein the sequencing module to place the messages that were accepted as intended for the recipient in sequential order based on their associated sequence number in order to create the transmission from the broadcaster.

23. The apparatus of claim 21, wherein the sequence number is at least one of appended to the end of the message in order to calculate the MAC or part of the shared secret key in order to calculate the MAC.

24. The apparatus of claim 23, wherein the sequence number is part of the shared secret key due to at least one of attaching the sequence number to the end of the shared secret key, adding the sequence, number to the shared secret key, or using the sequence number, as an object of a function with the shared secret key.

25. The apparatus of claim 21, wherein the shared secret key is a unique key kept between the recipient and the broadcaster and is based on a Diffie Hellman key exchange protocol.

* * * * *